(12) United States Patent
Walsh

(10) Patent No.: US 6,455,155 B1
(45) Date of Patent: Sep. 24, 2002

(54) TRUE-SECTION EXTRUDED PLASTIC CUTTER FILAMENT SYSTEM

(76) Inventor: Roger C. Walsh, 184 Front Street, Belleville On. (CA), K8N 2Y7

(*) Notice: Subject to any disclaimer, the term of this patent is extended or adjusted under 35 U.S.C. 154(b) by 20 days.

(21) Appl. No.: 09/752,763

(22) Filed: Jan. 3, 2001

(51) Int. Cl.$^7$ .................................................. D01F 6/00
(52) U.S. Cl. ...................................... 428/364; 428/397
(58) Field of Search ............................... 428/364, 397, 428/398, 399; 30/276, 353, 355, 356

(56) References Cited

U.S. PATENT DOCUMENTS

| | | | |
|---|---|---|---|
| 4,582,758 A | * | 4/1986 | Bruce et al. ................. 428/397 |
| 6,045,911 A | * | 4/2000 | Legrand et al. ............. 428/394 |
| 6,171,697 B1 | * | 7/2001 | Legrand ..................... 428/372 |

* cited by examiner

*Primary Examiner*—N. Edwards
(74) *Attorney, Agent, or Firm*—D. W. Eggins

(57) ABSTRACT

An improved cutting filament for use in a rotary trimmer is an extruded resin, being subject to vertical extrusion to sustain true-section profile, and to structural orientation to enhance the strength and toughness of the material. One embodiment, a polygonal extruded section is drawn down in size, being found to possess improved abrasive, herbiage-cutting characteristics. One embodiment has a finned profile with at least one fin in the form of a projecting rib, preferably with a scarified surface, to enhance its abrasive characteristics. In a polygonal section, the fin portions of the section are located at the apices of the polygon. The draw-down molecular orientation process enables the use of an extrusion die of sufficient size that the scarified finning provision is readily incorporated into the die. A mix of plastic resins consisting of 20 to 40 percent by weight of linear low density, or high density polyethylene, with the balance (75–80%) being polypropylene extrudes as a pliable, high strength, impact and abrasion resistant copolymer filament of adequate High Heat Resistance (HHR) to withstand use as a trimmer filament.

4 Claims, 2 Drawing Sheets

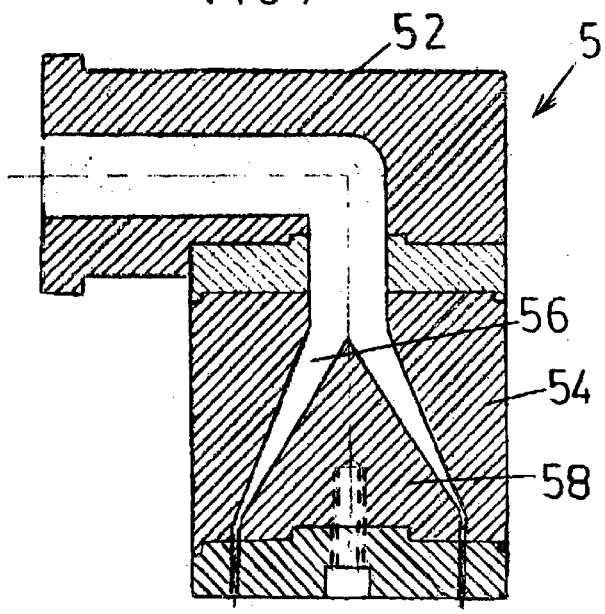
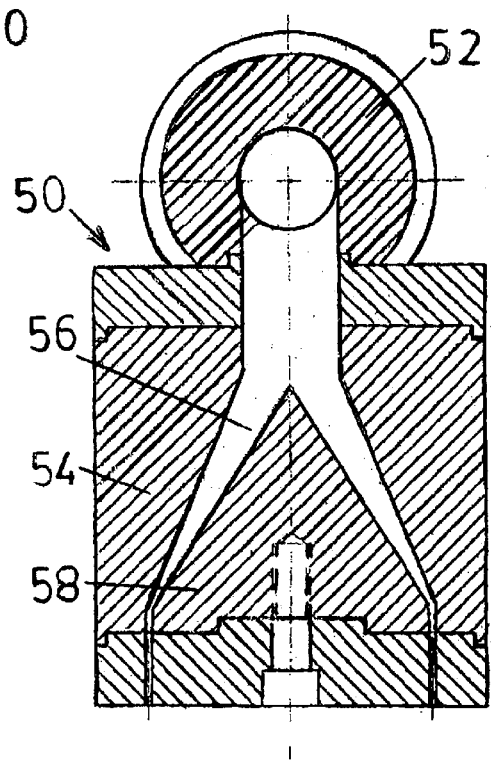
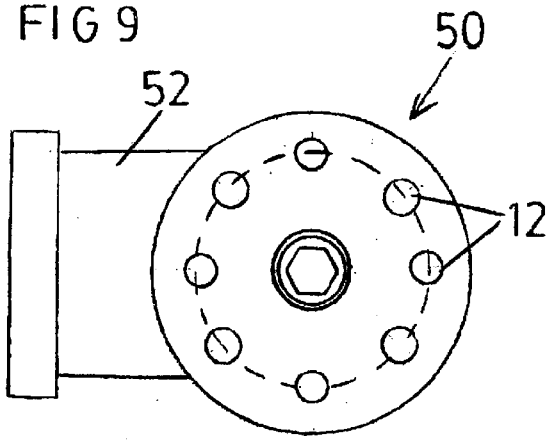

TRUE-SECTION EXTRUDED PLASTIC CUTTER FILAMENT SYSTEM

BACKGROUND OF THE INVENTION

1. Field of the Invention

This invention is directed to extruded plastic filaments, and in particular to a filament used as a cutting medium, in applications such as grass trimmers; and to apparatus and process for the manufacture thereof.

2. Description of the Prior Art

The use of extruded plastic filament as a cutting agent for grass trimmers is widespread.

In most instances the filament is mounted on a reel that is supported on an inverted rotatable spindle of a vegetation trimming machine. Such machines have a safety guard that at least partially overlies the extended filament, such that in operation the filament can contact vegetation such as grass, light shrubs, weeds and the like in cutting reaction therewith, due to the speed of rotation of the machine.

As a consequence, the free tip of the filament, which does much of the cutting is progressively abraded, requiring the release of a compensatory length of the filament from its reel in order to continue operation. Existing filaments are very susceptible to damage when coming into contact with common obstacles, particularly masonry, stones, drainpipes, etc.

The plastic resin presently most used consists of a nylon or a nylon/polyethylene copolymer, extruded through a die.

Such prior art filaments are subject to a high rate of breakage at the tip when impacting hard objects such as posts, cement blocks, walls, down-spouts and the like. Ribbed filament sections of the prior art, being of smooth finish, do not provide a very effective cutting profile.

In manufacturing such filaments, difficulties have been experienced in maintaining a true profile, due to the flattening effects of gravity on horizontally oriented extrudate. With higher temperature extrusions, the problems of diametical distortion have increased, so that the maintenance of tolerances is most difficult. Certain prior art trimmer filaments possess an inadequate High Heat Resistance (H.H.R.) value, so that in the high temperature environment of sustained operation self adhesion takes place.

SUMMARY OF THE INVENTION

The present invention provides an improved cutting filament for use in a rotary trimmer.

In one embodiment, a polypropylene filament is extruded, and subjected to an orientation process, to enhance the strength and toughness of the material.

In another embodiment, a polypropylene or polypropylene blended with polyethylene of low or of high density, extruded as an oversize polygonal section, is drawn down in size, being found to possess improved abrasive, herbiage-cutting characteristics.

A further embodiment has a finned profile with at least one fin in the form of a projecting rib. In the case of a polygonal section, this is preferably modified, wherein fin portions of the section are located at the apices of the polygon.

The application of a drawdown molecular orientation process enables the use of an extrusion die of sufficient size that the finning provision is readily incorporated into the die. The effective cutting action of the fin or fins is greatly enhanced when the sides and bottom surfaces of the die grooves are scarified, to be irregularly rough and jagged.

The present invention thus provides an extruded filament for use as an abrasion medium, wherein the filament consists of a polyolefin mixture having the molecular structure thereof at least partially axially oriented, to impart enhanced strength and abrasion resistance to the filament.

In particular, the filament is found to be useful as a cutting medium in a rotary herbiage trimming tool.

It has been found in one embodiment that a mix of plastic resins consisting of 20 to 40 percent by weight of linear low density polyethylene is mixed with 60–80 weight percent polypropylene copolymer or homopolymer as the balance a high strength, impact and abrasion resistant, pliable filament of adequate High Heat Resistance (HHR) is produced, which is able to withstand use as a trimmer medium without self-welding, in the usual hot working environment.

As an example, a Montell polypropylene, listed as an extrusion grade homopolymer No.6823, and with characteristics of MFR—0.5 dg/min; Tensile Strength—4800 psi; Flexural modulus—180,000 psi; IZOD Impact—1.5 ft-lb/in; HDT—205 F. degrees; rated Underwriters Lab 94HB, and with FDA Y1 rating gave excellent working results when extruded and processed in accordance with the presently disclosed process, with a service life improvement as a trimmer medium of more than 40 percent over standard commercial nylon trimmer filament.

In another example, Montell's SV-152 (nucleated) super high impact copolymer is used.

Some of these copolymers have a low Melt Flow Rate (MFR) of 2 or less, requiring extrusion at 500 F. degrees and higher; the lower the MFR value, the higher is the required extrusion temperature.

The combining of polyethylene resin, of high or low density to the polypropylene improves pliability.

The polypropylene supplied may incorporate high density polyethylene as one of its constituents.

One embodiment of the present filament has a polygonal cross section, wherein the apices of the polygon appear to serve as cutting edges, when employed with a rotary tool as an abrading agent.

A further embodiment of the filament may have a finned profile, to enhance the abrading action of the filament.

In the case of a filament having a polygonal profile, it may have at least one fin portion extending from an apex of the polygonal profile.

The finned filament may have a number of the fins, as in the case of a polygonal section, having each fin extending individually from a respective apex of the polygonal profile.

The provision of a scarified finish to the working surface of a filament has been found to greatly enhance the abrading effectiveness of the filament. This applies to plain, ribbed and circular section filaments.

In view of the drawing-down of the extruded section, a die of sufficient size is used wherein a scarified finish may be applied to surface portions of the die, using a toothed engraving tool.

The process of providing an oriented filament in accordance with the present invention includes the steps of providing a die of predetermined size, form and finish; extruding a selected plastic resin at a first, extrusion temperature in a predetermined first temperature range; minimally cooling the extrudate to a first handling temperature; passing the extrudate through a first drawing apparatus operating at a first linear speed; heating the extrudate to a second, orienting temperature in a predetermined second temperature range; drawing-down to a filament the re-heated extrudate at a second linear speed in the range six to nine times the first linear speed, to orient the structure of the filament in a substantially axial direction by tensioning by means of a high speed orienting puller, including the step of cooling the oriented filament prior to passage thereof through the orienting puller; and coiling the oriented filament on a spool winder. In the case of a resin having a high percentage content of polypropylene, a normal cooling bath may be somewhat inadequate, due to the high extrusion temperature required for this material. It has been found that a venturi cooler may be employed, having a conical shape, through which the extrudate is passed.

Coolant admitted at the throat flows about the extrudate in effective cooling relation as it passes through the diverging shape of the conical cooler, usually into a cooling bath.

In the case of a circular section filament, in order to maintain a substantially circular extruded section, within reasonably specified tolerances, and to avoid the section flattening that can readily occur with high temperature extrusion, the extrusion die is preferably oriented with its polar axis vertical, discharging substantially directly into a cooling bath.

In an extrusion head having an annular array of die orifices, a dispersaL cone is located upstream of the die orifices, to facilitate uniformity of product mix.

BRIEF DESCRIPTION OF THE DRAWINGS

Certain embodiments of the invention are described by way of illustration, without limitation thereto other than as set forth in the accompanying claims, reference being made to the accompanying drawings, wherein:

FIGS. 5, 5A and 6 are cross-sections of hexagonal and circular filaments, some being shown having scarified finishes on the working surfaces thereof;

FIG. 7 is a front elevation, shown in diametrical section, of a multi-orifice vertical extrusion head;

FIG. 8 is a side elevation in diametrical section of the FIG. 7 embodiment (to a different scale); and, FIG. 9 is a view of an extrusion die face having an array of circular dies.

DETAILED DESCRIPTION OF THE INVENTION

Figure 1:
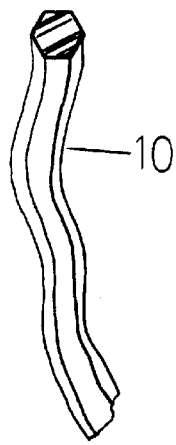
FIG. 1 shows a schematic arrangement of a portion of hexagon-section, polygonal filament according to the present invention.

Referring to FIG. 1, a length 10 of a polygonal filament (not to scale) is shown, a hexagonal section being shown for purposes of illustration.

Figure 2:
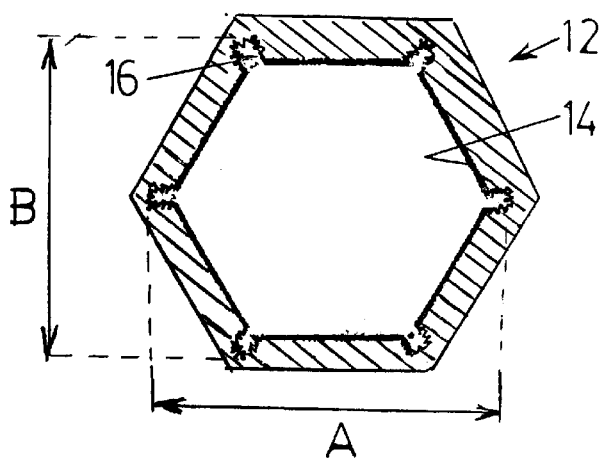
FIG. 2 is a schematic cross-section of a die for extruding a scarified ribbed filament in accordance with the invention.

In FIG. 2 a hexagonal die block 12 has a hexagonal die face 14, each of the apices of which is relieved by a recess 16. In an actual die embodiment the dimension "A" is 0.300 inches; dimension "B" is 0.250". The recesses 16 are made by an undersized hacksaw blade, which scarifies the effective working surfaces.

Figure 5:
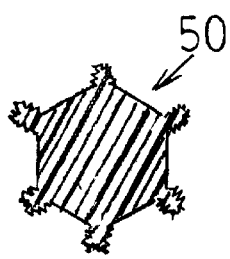
Figure 6:
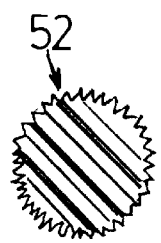

The effects of the scarified die surfaces are shown in the product 50, at FIG. 5. FIG. 6 shows a scarified cylindrical product 52, made by a scarified circular die (not shown). FIG. 5A illustrates the true circular profile of extrudate achieved by a vertical extruder, by the avoidance of gravitational flattening of the hot extrudate.

Figure 3:
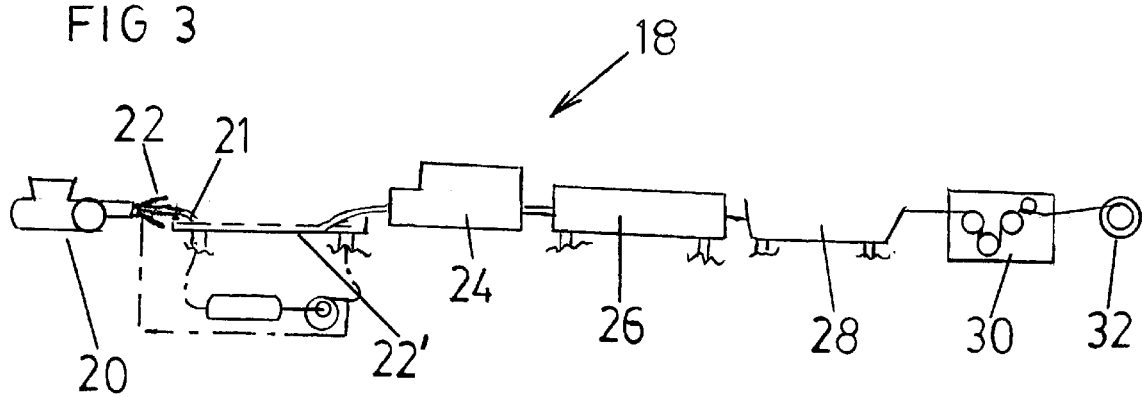
FIG. 3 is a diagramatic representation of a subject filament extrusion and orientation process.

FIG. 3 shows an extrusion and orientation line 18 for producing oriented filament.

The line 18 has a vertical extruder 20 feeding to a serial arrangement of a hot water cooling tray 22, a take-off puller 24 equipped with soft rubber belts (not shown), a re-heater hot air oven 26, a cooling tray 28, a high speed orienting puller 30, and a spool winder 32. The cooling tray 22 may have a recirculation pump 25, with temperature adjuster 27 for heating or cooling the water.

Figure 4:
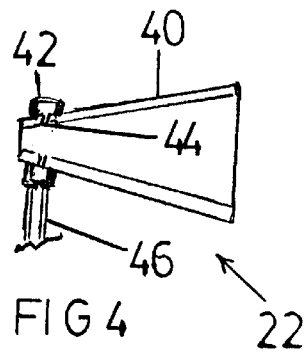
FIG. 4 is an enlarged portion of FIG. 3, showing the venturi cooler.

Referring to FIG. 4, a venturi cooler 22 is shown having divergent conical walls 40, with a coolant gallery 42 about the throat portion 44. Hot water is supplied by way of supply pipe 46, as a shower over the extrudate as it passes through the cooler 22. High rates of cooling may be provided by evaporative cooling, if required.

In one example, a resin blend, comprising 20 to 40 weight % linear low density polyethylene with the balance being polypropylene copolymer or homopolymer was extruded, the extruder 20 operating in the range 450 to 500 F. degrees. The extrudate 21 passing through the cooler 20 to the water cooling tray 22, operating at 200 F. degrees; from thence to the puller 24, having soft rubber belts to grip without marring the extruded profile. From the puller 24 the extrudate 21 is drawn through the hot air oven 26, operating in the range 425 to 475 F. degrees, which heats the extrudate sufficiently to permit extreme extension, with consequent orientation. This extension is generated by the orienting puller 30, having pinch rolls operating at a speed in the range six to nine times faster than the take-off puller 24.

A cooling water tray upstream of the puller 30 is operated in the range 80 to 100 F. degrees. From the puller 30, the reduced, oriented, or partially oriented filament product is wound onto spools by spool winder 32.

Referring to FIGS. 7, 8 and 9, an injection die 50 has a cross-head portion 52 for attachment to an injection molding machine, not shown. A downwardly extending die head 54 has a divergent passage 56 containing a dispersion cone 58, that forms in conjunction with the passage 56 an annular arrangement of convergent flow passages, each passage containing a die such as the die 12, in accordance with the present invention.

What is claimed is:

1. An extruded filament for use as an abrading medium in a rotary device, wherein said filament consists of a polygonal section profile having at least one fin portion extending from an apex of the polygonal profile, said filament being of plastic having the molecular structure thereof substantially axially aligned, to impart enhanced strength and abrasion resistance to the filament.

2. The filament as set forth in claim 1, having a plurality of said fins, each extending individually from a respective said apex.

3. The filament as set forth in claim 1 wherein said plastic consists of a copolymer including 20 to 40 weight percent of linear low density polyethylene mixed with 60 to 80 weight percent of polypropylene.

4. The filamant as set forth in claim 1, said at least one fin portion having an abrading working surface, wherein said surface is scarified.

* * * * *